March 1, 1960 W. RICHTER 2,927,266
TEST CIRCUIT FOR MAGNETIC CORE INDUCTIVE REACTORS
Filed Dec. 14, 1956 2 Sheets-Sheet 1

INVENTOR.
Walther Richter
BY
Attys.

INVENTOR.
Walther Richter

United States Patent Office 2,927,266
Patented Mar. 1, 1960

2,927,266

TEST CIRCUIT FOR MAGNETIC CORE INDUCTIVE REACTORS

Walther Richter, Milwaukee, Wis., assignor to Electro-Seal Corporation, Des Plaines, Ill., a corporation of Illinois Application December 14, 1956, Serial No. 628,300

8 Claims. (Cl. 324—34)

The present invention relates to test circuits and particularly to methods of and arrangements for determining the characteristics of reactors with ferro-magnetic cores.

A general object of the present invention is to provide improved methods of and apparatus for measuring at a selected frequency and at a selected magnetic density the characteristics of an inductive reactor having included therein a ferro-magnetic core.

A further object of the invention is to provide an improved test circuit of the bridge type for measuring the characteristics of a magnetic structure comprising an inductive coil carrying therein a magnetic core, or iron samples functioning as the magnetic core, wherein the copper loss normally affecting such measurements is eliminated.

An additional object of the invention is to provide an improved test circuit of the Hay's bridge type which includes a test inductor provided with conventional magnetic core structure, or provided with standard iron samples that function as the magnetic core structure, and which test circuit is capable of providing accurate measurements from which the reactance of the inductor, the A.-C. core loss of the magnetic core structure and the reactive power necessary to magnetize the core structure can be determined.

A more specific object of the invention is to provide an improved test circuit making use of a modified Hay's bridge in which a test inductor carries therein iron samples of which the characteristics are to be measured and includes a test winding which is coupled to the exciting winding of the test inductor and which is connected in the bridge to form one arm thereof, whereby the copper loss in the exciting winding is eliminated from the bridge circuit, and wherein the bridge can be balanced by varying in a suitable manner the impedance of the other arms of the bridge in order thereby to provide measurements from which the characteristics of the iron samples can be determined.

Further features of the invention pertain to the particular arrangement of the circuit elements in the bridge test circuit whereby the above outlined and additional features thereof are attained.

The invention, both as to its organization and method of operation, together with further objects and advantages thereof, will be best understood by reference to the following specification taken in conjunction with the accompanying drawings, wherein.

Figure 1A:
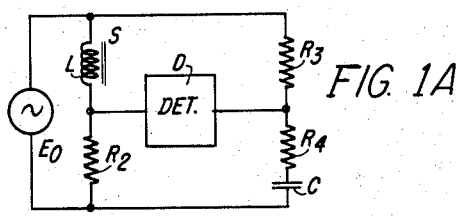
Figure 1A illustrates in schematic form the circuit of a conventional Hay's bridge.

Referring now to the drawings, there is shown in Fig. 1A a conventional Hay's bridge circuit whereof one branch arm comprises a magnetic structure including an inductive coil L and a magnetic core S formed of sample strips of ferromagnetic material or formed of a complete magnetic core. A resistor $R_2$ comprises a second branch arm of the bridge and is connected in series with the coil L across the A.-C. source $E_0$. The branch arm diagonally opposite the resistor $R_2$ comprises a resistor $R_3$ and the branch arm of the bridge diagonally opposite the branch arm including the magnetic structure comprises a resistor $R_4$ and a capacitor C connected in series. A bridge balance detector D is connected to the junction between the magnetic structure and the resistor $R_2$ and to the junction between the resistor $R_3$ and the series connected resistor $R_4$ and capacitor C.

Figure 1B:
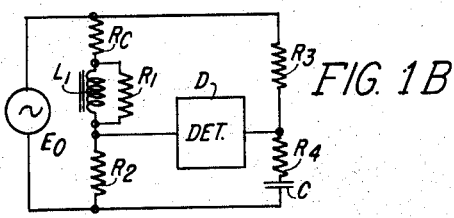
Fig. 1B illustrates in schematic form an equivalent circuit of the Hay's bridge of Fig. 1A.

Upon application of power from the source $E_0$ to the bridge the inductive coil L is excited by the alternating current and exhibits an impedance which results in a voltage drop and a power loss therein. A portion of this power loss is due to the ohmic drop in the wire of which the coil L is wound and is known as the "copper loss," and the remainder of the power loss is due to the characteristics of the magnetic core S and is known as the "A.-C. core loss." Considering the coil L to be a pure inductance having a value $L_1$, the copper loss manifests itself as if a resistance of a value $R_c$ were connected in series with the inductance $L_1$ and the A.-C. core loss manifests itself as if a resistance of a value $R_1$ were connected in parallel with the inductance $L_1$, wherein for the given frequency and the given voltage of the source $E_0$ the resistance $R_c$ is such that the loss occurring therein is equal to the loss occurring in the wire of the coil L and the resistance $R_1$ is such that the loss occurring therein is equal to the loss occurring in the core structure S. Accordingly, the impedance of the coil structure, including the coil L and the core structure S may be represented by a reactive component $L_1$ connected in series with a resistive component $R_c$ and connected in parallel with a resistive component $R_1$, as shown in Fig. 1B. With the value of the resistive component $R_1$ and the voltage drop therein known a determination of the power loss in the core structure S can be made. Inasmuch as the magnetic characteristics of any core structure are nonlinear, the power loss so determined is valid only for the exciting voltage frequency and the magnetic density conditions existing at the time of the measurements.

Referring to Fig. 1B and assuming a condition of bridge balance wherein the values of $R_2$, $R_3$, $R_4$ and C are known, any determination for the value of the resistive component in the bridge arm including $L_1$, $R_c$ and $R_1$ will necessarily include both of the resistive components $R_c$ and $R_1$ which determination is unsatisfactory for the purpose of accurately measuring the A.-C. core loss of the magnetic structure. Accordingly, a conventional Hay's bridge as shown in Figs. 1A and 1B is not useful for rendering accurate measurements from which the A.-C. core loss in the magnetic core S can be determined.

However it has been discovered that if the conventional Hay's bridge of Fig. 1A is modified by winding in parallel with the coil L another coil L' and connecting this coil L' in the bridge in place of the coil L the impedance due to the flow of exciting current through the wire of the coil L is effectively eliminated from the balance circuit of the bridge.

Figure 2A:
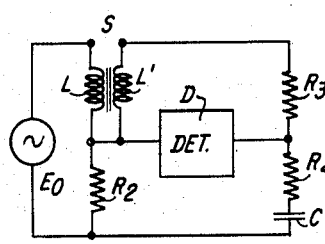
Fig. 2A illustrates in schematic form the circuit of a modified Hay's bridge embodying the principles of the present invention.
Figure 2B:
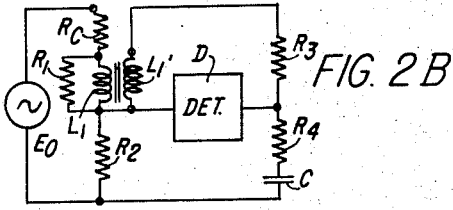
Fig. 2B illustrates in schematic form an equivalent circuit of the modified Hay's bridge of Fig. 2A.

Specifically, there is shown in Fig. 2A a modified Hay's bridge incorporating the principles of the present invention wherein the magnetic structure includes the inductive coil L, the magnetic core S and an inductive coil L', the latter being wound in parallel to the coil L and including, for purposes of present discussion, the same number of turns as the inductive coil L. The coil L' comprises one branch arm of the bridge and is connected in series with the resistor $R_2$ in the bridge circuit which bridge circuit, as previously pointed out, also includes the resistors $R_3$ and $R_4$ and the capacitor C, and the coil L is connected in series with the resistor $R_2$ across the terminals of the A.-C. source $E_0$. The equivalent circuit of this arrangement is shown in Fig. 2B wherein the reactive component $L_1$ with the series connected resistive component $R_c$ and the parallel connected resistive component $R_1$ are shown connected in series with the resistor $R_2$ across the terminals of the source $E_0$ and the reactive component $L_1'$ which is equal to the reactive component $L_1$ is shown connected in series with the resistor $R_2$ in the bridge. The voltage across the reactive component $L_1$ is due only to the pulsating flux through the reactances $L_1$ and $L_1'$ so that the voltage across the one bridge arm of the bridge formed by the reactive component $L_1'$ does not include the ohmic drop due to the exciting current and this voltage is equal to and in phase with the voltage across the reactive component $L_1$ and its parallel connected resistive component $R_1$.

Figure 3:
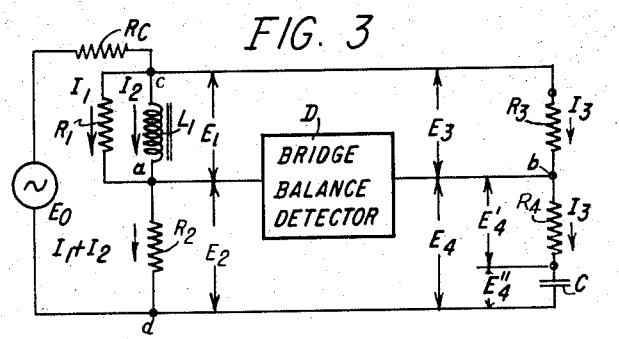
Fig. 3 illustrates in schematic form a further simplified equivalent circuit of the modified Hay's bridge shown in Fig. 2A.

The circuit of Fig. 2B which is the equivalent of the actual circuit of Fig. 2A can now be redrawn as an equivalent circuit as shown in Fig. 3, wherein the reactive component $L_1'$ has been eliminated and the reactive component $L_1$ and the parallel connected resistive component $R_1$ is shown as forming one branch arm of the bridge and the resistive component $R_c$ is simply in series with the source $E_0$ and disassociated from the bridge and could be considered as part of the internal resistance of the source powering the bridge. In this equivalent circuit arrangement the parallel components $L_1$ and $R_1$, forming one branch arm of the bridge, are connected to the resistor $R_2$, forming a second branch arm of the bridge, at a bridge junction point $a$ and are connected to the resistor $R_3$, forming the third branch arm of the bridge, at a bridge junction point $c$. The series connected resistor $R_4$ and capacitor C form the fourth branch arm of the bridge wherein the resistor $R_4$ is connected to the resistor $R_3$ at a bridge junction point $b$ and the capacitor C is connected to the resistor $R_2$ at a bridge junction point $d$. The bridge balance detector D is connected between the bridge junction points $a$ and $b$ and the source $E_0$ with the series resistive component $R_c$ provides power for the bridge at the junction points $c$ and $d$.

Considering now the method in accordance with the invention by which the A.-C. core loss of the core structure S in the true circuit of Fig. 2A may be determined and referring for purposes of explanation to the circuit of Fig. 3 which, as described above, is the equivalent of the true circuit of Fig. 2A, it is assumed that power from the A.-C. source $E_0$ is provided to the bridge at the junction points $c$ and $d$ and that the detector D records a condition of bridge balance. In this condition no voltage or potential difference exists between the junction point $a$ and the junction point $b$. Accordingly, the voltage drop $E_3$ across the resistor $R_3$ is equal to and in phase with the voltage drop $E_1$ across the parallel connected resistive and reactive components $R_1$ and $L_1$ and the voltage drop $E_2$ across the resistor $R_2$ is equal to and in phase with the voltage drop $E_4$ across the series connected resistor $R_4$ and capacitor C. Additionally for the condition of bridge balance the current through the resistor $R_3$ and the current through the series combination of the resistor $R_4$ and the capacitor C must be equal, and the sum of the component currents through the parallel combination of the resistive component $R_1$ and the reactive component $L_1$ must be equal to the current through the resistor $R_2$.

The current $I_3$ through the resistor $R_3$ is in phase with the voltage $E_3$ and in phase with the voltage $E_1$ and as the same current $I_3$ flows through the resistor $R_4$ and capacitor C, the voltage $E_4$ thereacross produced by the current $I_3$ includes a component voltage $E_4'$ across the resistor $R_4$ which is in phase with the current $I_3$ and therefore in phase with the voltage $E_1$ and includes a component voltage $E_4''$ across the capacitor C which lags the voltage $E_1$ by 90°. The component current $I_1$ through the resistive component $R_1$ is in phase with the voltage $E_1$ and the component current $I_2$ through the reactive component $L_1$ lags the voltage $E_1$ by 90° so that the voltage $E_2$ across the resistor $R_2$, which is due to the flow therethrough of a current equal to the sum of the component currents $I_1$ and $I_2$, may be considered to be the sum of two component voltages, a first component voltage corresponding to the component current $I_1$ which is in phase with the voltage $E_1$ and a second component voltage corresponding to the component current $I_2$ which lags the voltage $E_1$ by 90°. As the voltages $E_2$ and $E_4$ must be equal to each other, as set out above, then it is evident that the in phase components of the voltages $E_2$ and $E_4$ must be equal to each other and the 90° lagging components of the voltages $E_2$ and $E_4$ must be equal to each other.

Diverging for a moment, it may be appreciated from the above explanation that for the condition of bridge balance the magnitude of the A.-C. voltage at points $a$ and $b$ of the bridge are equal and that the phase of the A.-C. voltages at points $a$ and $b$ of the bridge are the same, accordingly the condition bridge balance may be indicated by a detector which is either a voltage responsive device or a phase responsive device.

Considering again the voltage and current relationships in the circuit, the relationships may be expressed mathematically as follows:

(1) $$E_1 = E_3 \text{ and } E_2 = E_4$$

(2) $$I_3 = \frac{E_3}{R_3} = \frac{E_1}{R_3}$$

(3) $$E_4 = E_4' + E_4'' = I_3 R_4 - j\frac{I_3}{\omega C} = I_3\left(R_4 - j\frac{1}{\omega C}\right)$$
$$= E_1\left(\frac{R_4}{R_3} - j\frac{1}{\omega R_3 C}\right)$$

(4) $$E_2 = R_2(I_1 + I_2) = R_2\left(\frac{E_1}{R_1} + \frac{E_1}{j\omega L}\right)$$
$$= E_1\left(\frac{R_2}{R_1} - j\frac{R_2}{\omega L_1}\right)$$

Since $E_2$ is equal to $E_4$, the real as well as the imaginary components of these two voltages must be equal. We therefore have:

(5) $$\frac{R_4}{R_3} = \frac{R_2}{R_1} \text{ or } R_1 = \frac{R_2 R_3}{R_4}$$

(6) $$\frac{1}{R_3 C} = \frac{R_2}{L_1} \text{ or } L_1 = R_2 R_3 C$$

The loss occurring in the resistive component $R_1$ in the first branch arm of the bridge and which represents the A.-C. core loss P is given by:

(7) $$P = \frac{E_1^2}{R_1} = E_1^2 \frac{R_4}{R_2 R_3}$$

The reactive volt-amperes consumed in the core, which may also be of interest, are therefore given by:

(8) $\quad$ Reactive volt-amperes $= \dfrac{E_1^2}{\omega L_1} = \dfrac{E_1^2}{\omega C R_2 R_3}$ However, it is understood that the determinations made from these equations, and particularly the determinations with regard to the A.-C. core loss are valid only for the magnetic flux density in the magnetic core of the inductance at the time of the bridge balance. Accordingly, if the purpose of the test is to determine the A.-C. core loss and the magnetizing volt-amperes of the magnetic core material at selected magnetic flux densities, the flux density through the magnetic core must be controllable and determinable.

In order to control and determine the flux density through a piece of magnetic material such as the magnetic core S of Fig. 2A it is first necessary to know the cross sectional area of the core and this may be calculated from the known length and weight of the core and from the known density of the material which forms the core. The cross-sectional area A of a magnetic core may be expressed as:

(9) $\quad A = \dfrac{W}{l \cdot d}$ where W is the weight, $l$ is the length and $d$ is the density of the material forming the core.

In addition, in order to control and determine the flux density through a piece of magnetic material such as the magnetic core S it is necessary to know the average voltage induced in the exciting coil such as the coil L of Fig. 2A and this may be determined simply by connecting a voltmeter across the terminals of the coil L′ or, more practically, by including in the magnetic structure of Fig. 2A a third coil L″ (not shown) identical to L and L′ having a voltmeter connected across the terminals thereof. The reading of voltmeter will be equal to the voltage $E_1$ of Fig. 3 and, stated in terms of the actual circuit of Fig. 2A, will be the average voltage induced in each of the coils L and L′ or, stated in the terms of the equivalent circuit of Fig. 3, will be the average voltage across the parallel connected components $L_1$ and $R_1$ during one cycle of flux change. The average voltage $E_1$ may be expressed as follows:

(10) $\quad E_{1(av.)} = 4 \cdot A \cdot B \cdot f \cdot n \cdot 10^{-8}$ volts where A is the cross sectional area of the magnetic core in square inches, B is the maximum flux density in Maxwell per square inch, $f$ is the frequency of flux change and $n$ is the number of turns in the winding surrounding the magnetic core.

Accordingly, by modifying the actual circuit of Fig. 2A to include a third coil L″, having a voltmeter M connected across the terminals thereof, to measure the voltage $E_1$ induced across the terminals thereof a determination can be made from Equation 10 as to the maximum flux density of the pulsating flux through the magnetic core S. If it is desired to establish a given maximum flux density B in the magnetic core S, the appropriate value for the voltage $E_1$ to establish the flux density may be determined from Equation 10 and thereupon the output of the A.-C. power source $E_0$ may be adjusted until the determined voltage $E_1$ is read on the meter M.

In view of the foregoing, it is clear that by modifying the actual bridge circuit of Fig. 2A to include a third winding L″ having a voltmeter M connected across the terminals for determining the voltage $E_1$ and that by balancing the bridge and ascertaining for the condition of bridge balance the resistance of the resistors $R_2$, $R_3$ and $R_4$, the value of the resistive component $R_1$ representative of the loss producing impedance of the core S may be determined from Equation 5 and the power loss P in the core S, that is the A.-C. core loss, may be determined from Equation 7. Additionally, by ascertaining for the condition of bridge balance the resistance of the resistors $R_2$ and $R_3$ and the capacitive reactance of the capacitor C, the value of the reactive component $L_1$ representative of the true inductance of the winding L may be determined from Equation 6 and the reactive volt-amperes consumed in the core S may be determined from Equation 8.

Figure 5:
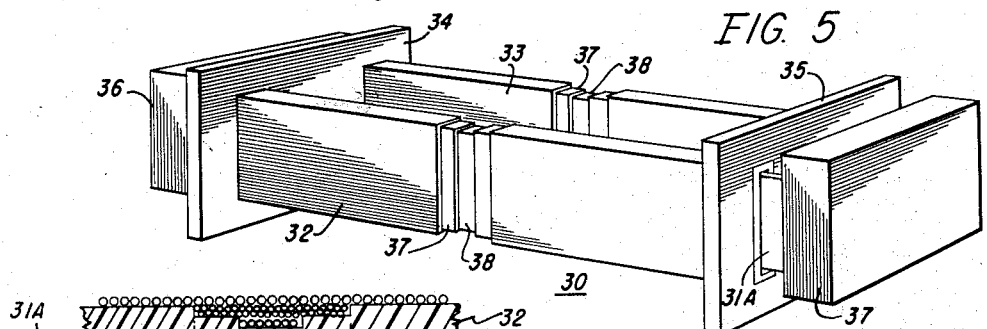
Fig. 5 is a perspective view of a mounting frame including mounting sheaths for carrying therein the standard iron samples and for carrying thereon the exciting winding and the measuring windings for the test circuit shown in Fig. 4.
Figure 6:
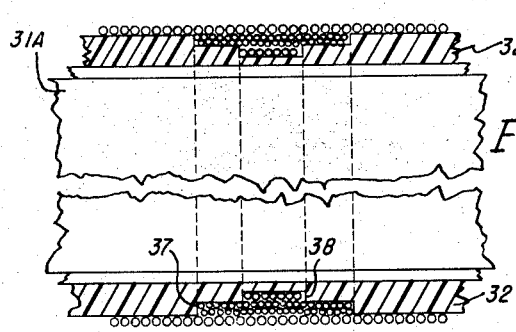
Fig. 6 is an elevational cross-sectional view of one of the mounting sheaths shown in Fig. 5 showing the disposition thereon of the various windings.
Figure 4:
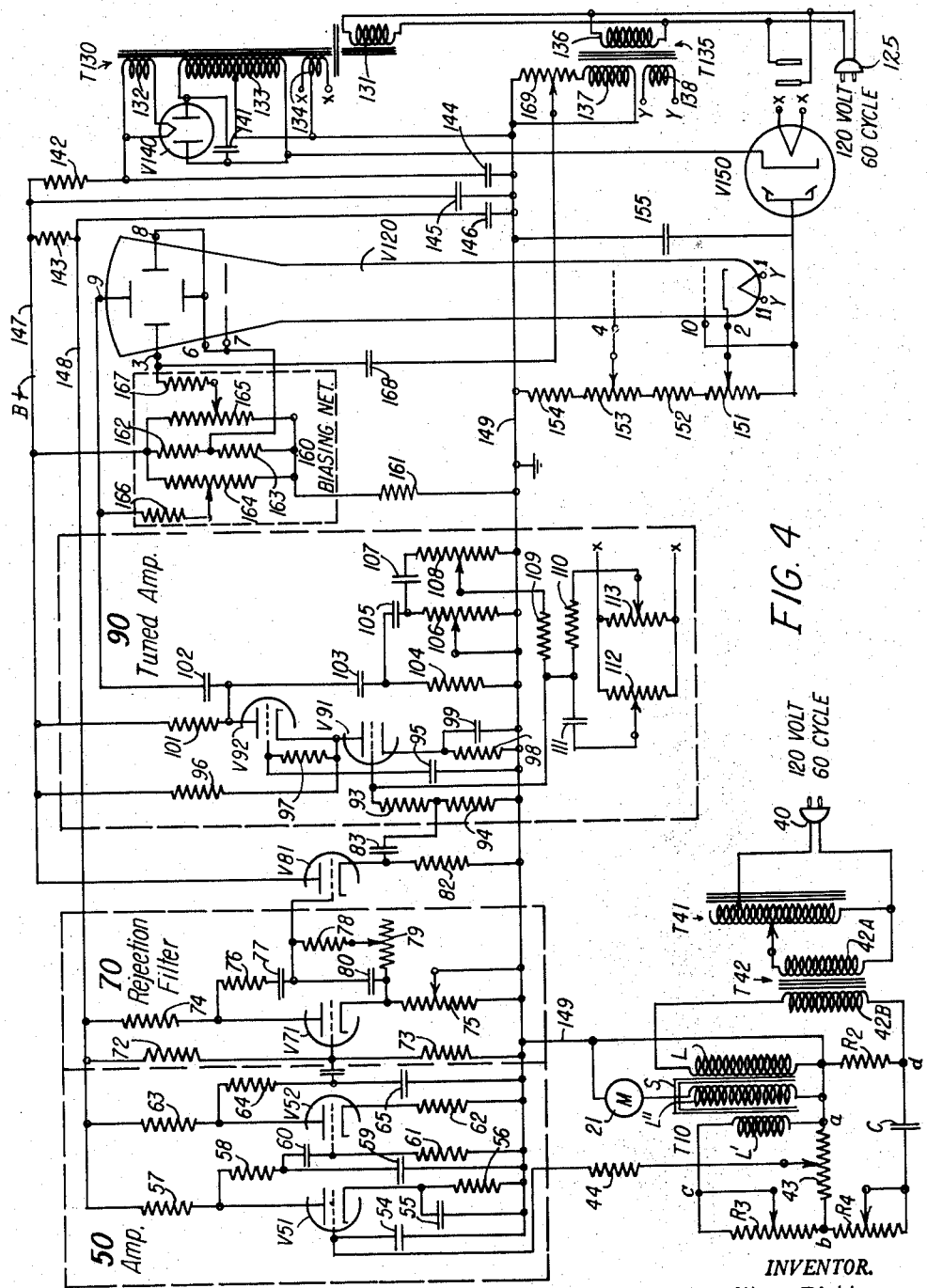
Fig. 4 is a schematic diagram of an exemplary embodiment of the modified Hay's bridge circuit embodying the principles of the present invention and including the details of the bridge balance detector circuit thereof.

An embodiment of the present invention incorporating the above described features is illustrated in schematic form in Fig. 4, and the details of the magnetic core sample mounting frame used in the circuit and the arrangement of the core energizing winding $L_1$, the bridge winding L′, and the voltage measurement winding L″ are shown in Figs. 5 and 6, respectively.

The mode of operation of the circuit shown in Fig. 4 will be better understood by considering first the arrangements illustrated in Figs. 5 and 6. In Fig. 5 there is shown a mounting frame 30 for receiving two matched samples 31A and 31B (the latter not shown) of magnetic core material, each chosen to be approximately 3 centimeters wide and approximately 6″ long and to be made up of a stack of laminations having a total thickness of approximately 1/10 of an inch. These samples are slidably carried in sheaths 32 and 33, which sheaths are supported at their ends by end-plates 34 and 35. The sheaths are slightly shorter than the length of the samples so that the ends of the samples protrude therefrom into contact with magnetic keepers 36 and 37, disposed at opposite ends of the mounting arrangement, so that a rectangular flux path is formed through the samples and the magnetic keepers. In the central portion of each of the sheaths are circumferential channels 37 and 38, the channel 37 being recessed from the surface of the sheath and the channel 38 being included within the boundaries of channel 37 and being further recessed from the surface of channel 37. In the channel 38 of each of the sheaths 32 and 33 is wound a number of turns of wire which comprises ½ of the winding L′ and in the channel 37 is wound a number of turns of wire which comprises ½ of the winding L″ and then a number of turns of wire are wound over the sheath extending between the end faces 34 and 35 to comprise ½ of the winding L. As there are two sheaths and each includes corresponding channels therein the winding L′ is comprised of the windings located in the channels 38 of both of the sheaths 32 and 33, the winding L″ is comprised of the windings located in the channels 37 of both of the sheaths 32 and 33, and the winding L is comprised of the windings encompassing both of the sheaths 32 and 33 between the end faces 34 and 35. Thus there is disclosed an arrangement which holds two magnetic core samples of substantially equal length, width and thickness so that a magnetic flux of relatively uniform density will be established therethrough, and wherein the coils for the windings L′ and L″ are confined to the center portions of the sheaths and are closely coupled to the winding of L so that for all practical purposes each turn of the windings L′ and L″ are linked with substantially the same number of lines of magnetic flux.

Referring now to the embodiment of the invention illustrated in schematic form in Fig. 4, there is shown therein a modified Hay's bridge including the details of a voltage responsive bridge balance detector therefor. Referring specifically to the modified Hay's bridge arrangement there is included therein a Variac T41 and a step-down transformer T42 which are connected to a 120 volt, 60 cycle source for applying power to the bridge. The bridge itself comprises the fixed resistor $R_2$, the resistors $R_3$ and $R_4$ which are here shown are adjustable to any desired resistance, the capacitor C and a magnetic structure $T_{10}$ including the windings L, L′ and L″ and the magnetic core S. The winding L and the resistor $R_2$ are connected in series at the bridge junction point $a$ and as shown in Fig. 2A are connected across a source of power here illustrated as being provided from the secondary winding 42B of the transformer T42. The winding L' is connected to the junction point a and therefrom through the resistor R₂ to the junction point d. In addition the winding L' is connected to the junction point c and therefrom through the resistance element and the adjustable arm of the resistor R₃ to the junction point b. The resistor R₃ is connected at the junction point b to the resistance element of the resistor R₄ and through the resistance element and the adjustable arm of the resistor R₄ and the series connected capacitor C to the junction point d. The winding L" is connected in a series loop through the voltmeter M to the junction point a. In order to provide a take-off point for the bridge balance detector a potential divider 43 is provided which has a resistor element connected between the junction points a and b and which has an adjustable arm connected via a resistor 44 to the input of the bridge balance detector. The junction point a is connected to reference ground in the bridge balance detector via a lead 149.

Referring now to the bridge balance detector, there is included therein an amplifier circuit 50 which acts as the input stage therefor, a rejection filter 70, a tuned amplifier 90, a cathode ray tube V120, a biasing network 160 for the cathode ray tube V120 and power equipment including transformers T130 and T135 for supplying power to the bridge balance detector circuits.

Referring specifically to the circuits included in the bridge balance detector, the amplifier 50, has included therein a vacuum tube V51, a vacuum tube V52 and filters for attenuating the higher harmonics of the 60 cycle signal applied thereto from the bridge circuit. The rejection filter 70 comprises a Wien bridge network which is sharply tuned for zero output at the third harmonic frequency, or 180 cycles, and includes the vacuum tube V71. The output from the rejection filter 70 is applied via the vacuum tube V81, which is connected in a cathode follower coupling circuit, to the tuned amplifier 90. The tuned amplifier 90 includes the vacuum tubes V91 and V92 which are connected in "cascode," whereof the amplifier output from the vacuum tube V92 is applied to one of the vertical plates of the cathode ray tube V120. In addition, the output from the vacuum tube V92 is applied via a negative feed-back network to the control grid of the vacuum tube V91 in order to sharply tune the amplifier 90 for 60 cycle output. Additionally, provision is made for injecting a 60 cycle voltage into the amplifier circuit 90 at the control grid of the vacuum tube V91 for the purpose of cancelling any 60 cycle pickup noise that might have been injected into the signal in the preceding stages. In this manner there is provided a bridge balance detector including an amplifier stage attenuating the higher harmonics, a 180 cycle filter and a high gain 60 cycle amplifier, so that the output from the amplifier 90, and accordingly the input to the vertical plates of the cathode ray tube V120 is substantially a 60 cycle signal.

The D.-C. voltages necessary for the operation of the vacuum tubes in the bridge balance detector are obtained in a conventional manner by rectifying appropriate A.-C. voltages supplied by a transformer T130. One half of the center tapped high voltage winding of this transformer is furthermore used in a half-wave rectifier circuit in connection with a rectifier tube V150 to supply a D.-C. voltage, negative with respect to ground, for operation of the cathode ray tube V120. Grid and focusing voltages for this tube are obtained in the conventional manner by placing a series group of bleeder resistors 151 to 154 across this negative voltage.

Referring now to the transformer T135, there is included therein a primary winding 136 and secondary windings 137 and 138 of which the primary winding 136 is supplied from a 120 volt 60 cycle source via the terminal plug 125. The secondary winding 137 is connected in series with the resistor element of a potential divider 169 to ground potential on the conductor 149 and the secondary winding 138 is connected across the filaments of the cathode ray tube V120. The arm of the potential divider 169 is connected through a capacitor 168, which blocks the D.-C. voltage, to the horizontal deflection plates of the cathode-ray tube V120 in order to provide a 60 cycle variable voltage thereto.

Considering now the operation of the bridge test circuit of Fig. 4, it is assumed that two appropriate samples of the magnetic material are positioned within the sheaths 32 and 33, respectively, of the frame 30 and are abutted at their ends by the keepers 36 and 37 to complete a flux path therethrough and to form the magnetic core S of the magnetic structure T10. As previously mentioned the sheaths 32 and 33 carry thereon the winding L, L' and L" of the magnetic structure T10. In actual practice each of the samples tested is a laminated stack of approximately .1" in thickness, approximately 6" long and approximately 3 centimeters wide, and prior to the placement of the samples in the sheaths, the weight, the length and the density thereof is determined accurately so that the average cross sectional area of the flux path through the samples can be established from Equation 9. Thereafter, 120 volt 60 cycle power is applied to the terminal plug 40 and via the Variac T41 and the transformer T42 through the series connected winding L and resistor R₂ so that magnetic flux is established in a path including the two samples and the keepers 36 and 37 thereby introducing into the bridge circuit a power loss producing element due to the properties of the magnetic material samples and also introducing into the bridge circuit an inductive reactance due to the winding L. In order to avoid extraneous magnetic losses in the flux path the abutting surfaces of the samples and of the keepers 36 and 37 are ground smooth to provide intimate contact therebetween and the length of the flux path through the keepers 36 and 37 is made to be small as compared to the length of the flux path through the sample, and the cross sectional area of the keepers is chosen to be much larger than the cross sectional area of the samples. In following this procedure the losses due to the use of keepers and abutting connections are made to be quite small as compared to the core losses in the samples themselves.

In the embodiment shown in Fig. 4 it is desirable that the resistance of the resistor R₂ is chosen to be small as compared to the anticipated value of the resistance of the resistive component R₁ which is representative of the loss producing impedance of the core structure S. By so choosing the resistor R₂ the voltages in the windings L, L' and L" will be substantially sinusoidal in wave form and substantially in phase with the voltage applied from the 120 volt 60 cycle power source.

Assuming further that it is desired to measure the core-loss in these samples at a specific magnetic flux density B, for example, 15,000 maxwells per square inch, the flux density can be controlled by varying at the Variac T41 the exciting voltage across the winding L and resistor R₂. For a specific desired magnetic flux density B the appropriate value for the average voltage $E_1$ that must be induced in the coil L" is determined from Equation 10 and is the voltage that must necessarily appear on the meter M. Having determined then from the Equation 10 the appropriate meter reading for a magnetic flux density of 15,000 maxwells per square inch, the Variac T41 is adjusted until the meter M records the desired voltage $E_1$. At this time the desired magnetic flux density is established in the samples of the magnetic material and the bridge may be adjusted to achieve a balance condition therein whereby the magnetic characteristics of the samples may be determined.

Considering now the utilization of the bridge in order to render a determination of the magnetic characteristics of the samples and assuming that the bridge is not balanced, a potential difference exists between the junction points a and b and this potential difference signal is applied via the arm of the potential divider 43 to the input of the amplifier 50 wherein the signal is amplified and its upper harmonics are attenuated, the amplified signal is then applied to the filter 70 wherein its 180 cycle component is rejected, and thereafter the signal is applied through the 60 cycle tuned amplifier 90 to one of the vertical plates of the cathode ray tube V120. Inasmuch as the horizontal sweep of the tube V120 is of 60 cycles, the signal applied from the amplifier 90 to the vertical deflection plate of the tube V120 produces a display on the face of the cathode ray tube V120 in the form of an ellipse thereby indicating a condition of unbalance. Thereafter, the adjustable resistors $R_3$ and $R_4$ in the bridge circuit are adjusted until the screen display on the face of the cathode ray tube V120 appears as a horizontal straight line thereby indicating the absence of an output voltage from the tuned amplifier 90 and, accordingly, indicating the absence of a 60 cycle input signal to the amplifier 50. At this time, the bridge is indicated to be balanced, and, as the resistance of the resistor $R_2$ is known and the resistors $R_3$ and $R_4$ are calibrated, the resistance of $R_3$ and $R_4$ may be read directly. It remains, then, only to employ Equations 5 and 7 in order to determine, respectively, the value of the resistance component $R_1$ which is representative of loss producing impedance of the magnetic sample material and the A.-C. core loss P of the sample magnetic material for the 60 cycle flux pulsation frequency and for a maximum flux density of 15,000 maxwells per square inch.

Considering now the ultization of the bridge in order to render a determination of the inductive reactance component $L_1$ which is representative of the true inductance of the winding L and assuming that the bridge is not balanced, the resistors $R_3$ and $R_4$ are adjusted for bridge balance and assuming the capacitive reactance of the capacitor C is known, it remains, then, only to employ Equation 6 in order to determine the value inductive reactance component $L_1$. With the value of $E_1$ known and the value of the inductive reactance component $L_1$ determined, Equation 8 may then be employed to determine the reactive volt-amperes consumed in the magnetic structure S.

In the foregoing explanation of the operation of the bridge circuit it has been assumed that the windings L, L' and L'' include equal numbers of turns whereas in actual practice it may be found more convenient to use different numbers of turns on the different windings. In the event that the latter circumstance is true it is obvious that the Equations 5, 6, 7 and 10 must include appropriate adjustment factors which are determined by the number of turns in the respective windings and also by the weight W of the sample magnetic material. Under such conditions the value of the resistance component $R_1$ will be given in ohms per unit weight and the value of the A.-C. core loss P will be given in watts per unit weight. Further, it is to be appreciated that the specific and detailed bridge balance detector arrangement described herein is included for purposes of lending completeness to the description of the invention. This bridge balance detector is of the voltage responsive type and may be comprised of any number of different arrangements and embodiments or, as previously pointed out, it may be replaced by a bridge balance detector of a phase responsive type.

While any number of components may be employed in the bridge circuit, the specific values of the components employed in the embodiment of Fig. 4 reduced to practice:

| | |
|---|---|
| T41 | 1 amp. Variac. |
| T42 | 2 to 1 ratio step-down transformer. |
| 43 | 10,000 ohms. |
| M | 50 volts A.-C. rectifier type meter. |
| L | 1900 turns No. 22 copper wire. |
| L' | 40 turns No. 35 copper wire. |
| L'' | 1800 turns No. 38 copper wire. |
| $R_2$ | 5 ohms—1 watt precision resistor. |
| $R_3$ | 10,000 ohm Helipot. |
| $R_4$ | 500 ohm Helipot. |
| C | 1 microfarad. |
| V51 | 12AU7. |
| V52 | 12AU7. |
| 54 | .05 microfarads. |
| 55 | 25 microfarads. |
| 56 | 3300 ohms. |
| 57 | 68,000 ohms. |
| 58 | 68,000 ohms. |
| 59 | .05 microfarads. |
| 60 | .01 microfarads. |
| 61 | 1 megohm. |
| 62 | 3300 ohms. |
| 63 | 68,000 ohms. |
| 64 | 68,000 ohms. |
| 65 | .05 microfarads. |
| V71 | 12AU7. |
| 72 | 10 megohms. |
| 73 | 1.5 megohms. |
| 74 | 22,000 ohms. |
| 75 | 15,000 ohms. |
| 76 | 220,000 ohms. |
| 77 | .005 microfarads. |
| 78 | 150,000 ohms. |
| 79 | 100,000 ohms. |
| 80 | .005 microfarads. |
| V81 | 12AU7. |
| 82 | 47,000 ohms. |
| 83 | .05 microfarads. |
| V91 | 12AT7. |
| V92 | 12AT7. |
| 93 | 100,000 ohms. |
| 94 | 15,000 ohms. |
| 95 | .01 microfarads. |
| 96 | 33,000 ohms. |
| 161 | 220,000 ohms. |
| 162 | 33,000 ohms. |
| 163 | 33,000 ohms. |
| 97 | 2.2 megohms. |
| 98 | 100 ohms. |
| 99 | 250 microfarads. |
| 101 | 100,000 ohms. |
| 102 | .05 microfarads. |
| 103 | .004 microfarads. |
| 104 | 220,000 ohms. |
| 105 | .004 microfarads. |
| 106 | 1 megohm. |
| 107 | .004 microfarads. |
| 108 | 250,000 ohms. |
| 109 | 470 ohms. |
| 110 | 22 megohms. |
| 111 | 100 micro-microfarads. |
| 112 | 10,000 ohms. |
| 113 | 10,000 ohms. |
| V120 | 2API-A. |
| T130 | Sola 7104. |
| T135 | Stancor PS 8415. |
| V140 | 5Y3. |
| 142 | 1500 ohms. |
| 143 | 10,000 ohms. |
| 144 | 30 microfarads. |
| 145 | 30 microfarads. |
| 146 | 30 microfarads. |
| V150 | 6X4. |
| 151 | 50,000 ohms. |
| 152 | 100,000 ohms. |
| 153 | 150,000 ohms. |
| 154 | 220,000 ohms. |
| 150 | 10 microfarads. |
| 164 | 1 megohm. |
| 165 | 1 megohm. |
| 166 | 2.2 megohms. |
| 167 | 2.2 megohms. |
| 168 | .05 microfarads. |

In view of the foregoing it is apparent that there has been provided a bridge type test circuit of improved arrangement and construction and provided with a test inductor including as a magnetic core therein samples of magnetic material, wherein accurate measurements may be made from which the magnetic characteristics of the sample magnetic material can be accurately determined.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A test circuit for magnetic material comprising a balance bridge including a first branch arm formed of a test inductor having a test core of magnetic material and a second branch arm formed of a first resistor and a third branch arm formed of a second resistor and a fourth branch arm formed of a series connected third resistor and capacitor wherein said first and fourth branch arms are oppositely disposed in the bridge and are connected between said second and third branch arms, a bridge balance detector connected to the junction between said first and second branch arms and to the junction between said third and fourth branch arms, a source of alternating power, an energizing inductor wound on said test core and inductively coupled to said test inductor and connected to said test inductor at the junction between said first and second branch arms, and a connection extending between the terminals of said source of power via said energizing inductor and said first resistor, whereby a power loss is produced in said test core and the voltage drop in the first branch arm of said bridge is the voltage induced in said test inductor and corresponds to the power loss produced in said test core.

2. The test circuit set forth in claim 1, wherein said test inductor is wound with respect to said energizing inductor on said test core so that the voltage induced across the terminals thereof is in phase with the voltage in said energizing winding, and wherein any one of said first and second and third resistors is a variable resistance and is controllable for establishing equal in-phase voltages at the junction between said first and second branch arms and at the junction between said third and fourth branch arms of said bridge, whereupon a condition of balance is established in said bridge and registered by said bridge balance detector and the voltage drop in said first branch arm is equal to the voltage drop in said third branch arm and the voltage drop in said second branch arm is equal to the voltage drop in said fourth branch arm, whereby the resistive component of said first branch arm corresponding to the power loss produced in said test core is a function of the resistance of said first and second and third resistors in the branch arms of said bridge.

3. The test circuit set forth in claim 2, wherein the resistance of said first resistor is substantially small as compared to the impedance of said energizing winding so that the voltage in said energizing winding is substantially in phase with the voltage of said source of alternating power, whereby said voltage drops across the branch arms of said balance bridge are substantially in phase.

4. The test circuit set forth in claim 2, further comprising means for ascertaining during the condition of bridge balance the voltage induced in said test inductor and the resistance of said first and second and third resistors, so that the power loss produced in said test core which is a function of the voltage induced in test inductor and the resistance of said first and second and third resistors may be determined.

5. A test circuit for magnetic material comprising a balance bridge including a first branch arm formed of a test inductor having a test core of magnetic material and a second branch arm formed of a first resistor and a third branch arm formed of a second resistor and a fourth branch arm formed of a series connected third resistor and capacitor wherein said first and fourth branch arms are oppositely disposed in the bridge and are connected between said second and third branch arms, a bridge balance detector connected to the junction between said first and second branch arms and to the junction between said third and fourth branch arms, a source of alternating power having a first voltage terminal and a second voltage terminal, an energizing inductor wound on said test core and inductively coupled to said test inductor so as to induce in said test inductor a voltage in phase with the voltage in the energizing inductor, said energizing inductor being connected to said test inductor at the junction between said first and second branch arms, a connection extending from the first voltage terminal to the second voltage terminal of said source via said energizing inductor and said first resistor, whereby a power loss is produced in said test core and said test inductor has induced across the terminals thereof a voltage corresponding to the power loss produced in said test core, a voltmeter, and a measuring inductor wound on said test core and coupled to said energizing inductor and connected in a series loop through said voltmeter to the junction between said first and second branch arms, whereby said measuring inductor has induced across the terminals thereof a voltage measured by said voltmeter and corresponding to the voltage induced in said test inductor, said second and third resistors being variable resistances and controllable for establishing equal in-phase voltages at the junction between said first and second branch arms and at the junction between said third and fourth branch arms of said bridge so that a condition of balance exists in said bridge and is registered by said bridge balance detector, whereby the power loss produced in said test core of magnetic material is a function of the voltage measured by said measuring inductor and the measurable resistance of said first and second and third resistors.

6. A test circuit for magnetic material comprising a balance bridge including a first branch arm formed of a test inductor having a test core of magnetic material and a second branch arm formed of a first resistor and a third branch arm formed of a second resistor and a fourth branch arm formed of a series connected third resistor and capacitor wherein said first and fourth branch arms are oppositely disposed in the bridge and are connected between said second and third branch arms, a bridge balance detector connected to the junction between said first and second branch arms and to the junction between said third and fourth branch arms, a source of alternating power, an energizing inductor wound on said test core and inductively coupled to said test inductor so as to induce in said test inductor a voltage in phase with the voltage in the energizing inductor, said energizing inductor being connected to said test inductor at the junction between said first and second branch arms, and a connection extending between the terminals of said source of power via said energizing inductor and said first resistor whereby a power loss is produced in said test core and said test inductor has induced across the terminals thereof a voltage corresponding to the power loss produced in said test core, said second and third resistors being variable resistances and controllable for establishing equal and in-phase voltages at the junction between said first and second branch arms and at the junction between said third and fourth branch arms of said bridge whereupon a condition of balance exists in said bridge and is registered by said bridge balance detector.

7. The test circuit set forth in claim 6 wherein said bridge balance detector is of the voltage responsive type and is responsive at the fundamental frequency of said alternating source of power to the condition of equal voltages at said junction between said first and second branch arms and at the junction between said third and fourth branch arms of said bridge for indicating bridge balance.

8. The test circuit set forth in claim 6 wherein said bridge balance detector is of the phase responsive type and is responsive at the fundamental frequency of said alternating source of power to the condition of phase identity of the voltages at said junction between said first and second branch arms and at the junction between said third and fourth branch arms of said bridge for indicating bridge balance.

References Cited in the file of this patent

UNITED STATES PATENTS

| | | |
|---|---|---|
| 1,518,543 | Nyquist | Dec. 9, 1924 |
| 2,434,203 | Farrow | Jan. 6, 1948 |
| 2,526,338 | Elschlager | Oct. 17, 1950 |
| 2,569,691 | Roberts | Oct. 2, 1951 |